United States Patent
Dopico et al.

(10) Patent No.: US 6,566,459 B1
(45) Date of Patent: May 20, 2003

(54) MELAMINE-UREA-FORMALDEHYDE RESINS MODIFIED WITH CYCLIC UREA PREPOLYMER AND SODIUM METABISULFITE

(75) Inventors: Pablo G. Dopico, Conyers, GA (US); Stacey L. Wertz, Conyers, GA (US); James C. Phillips, Peachtree City, GA (US); George E. Mirous, University Place, WA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 10/133,315

(22) Filed: Apr. 29, 2002

(51) Int. Cl.[7] .......................... C08G 8/28; C08L 61/06; C08L 61/26
(52) U.S. Cl. .................. 525/498; 525/497; 525/499; 528/254; 528/256; 528/259; 428/502; 428/505
(58) Field of Search ................... 525/498, 497, 525/499; 528/254, 256, 259; 428/502, 505

(56) References Cited

U.S. PATENT DOCUMENTS

| | | | |
|---|---|---|---|
| 2,641,584 A | | 6/1953 | Martone, Jr. |
| 3,827,995 A | | 8/1974 | White et al. |
| 3,979,492 A | | 9/1976 | Sundie et al. |
| 4,677,159 A | * | 6/1987 | Lahalih et al. |
| 4,778,510 A | | 10/1988 | Hawkins |
| 4,820,766 A | * | 4/1989 | Lahalih |
| 5,362,842 A | | 11/1994 | Graves et al. |
| 5,389,716 A | | 2/1995 | Graves |
| 5,674,971 A | | 10/1997 | Graves |
| 5,681,917 A | | 10/1997 | Breyer et al. |
| 5,710,239 A | | 1/1998 | Tutin |
| 6,399,719 B1 | * | 6/2002 | Dopico et al. |

FOREIGN PATENT DOCUMENTS

EP 0 913 412 A1 5/1999

* cited by examiner

*Primary Examiner*—Duc Truong
(74) *Attorney, Agent, or Firm*—Banner & Witcoff, Ltd.

(57) ABSTRACT

A melamine-urea-formaldehyde resin modified with a cyclic urea prepolymer and sodium metabisulfite. Products prepared with the binder include wood composites such as particleboard and medium density fiberboard.

25 Claims, 2 Drawing Sheets

MELAMINE-UREA-FORMALDEHYDE RESINS MODIFIED WITH CYCLIC UREA PREPOLYMER AND SODIUM METABISULFITE

FIELD OF THE INVENTION

This invention relates to the preparation of melamine-urea-formaldehyde resins modified with cyclic urea prepolymer and sodium metabisulfite, to their use in binders, and to composite products prepared using the binders. Products prepared with the binders include wood composites such as particleboard, medium density fiberboard, plywood and fiber composites such as glass mats and other fiber composites

BACKGROUND OF THE INVENTION

Urea-formaldehyde resins are used in the preparation of wood composites such as particleboard and medium density fiberboard because of their processing advantages and low cost relative to other typical wood adhesives. Urea-formaldehyde resins are typically prepared by reacting urea and formaldehyde to form various methylolated ureas and their condensation products in ratios that depend on the temperature, pH and time for the reaction.

The use of urea-formaldehyde resins is limited to applications where exterior durability is not required. Melamine has been included in urea-formaldehyde binders to improve the moisture resistance of composites made with these binders. The moisture resistance of wood composites is measured by various test methods. Most commonly, the thickness swell and water absorption after 24 hours according to ASTM D 1037 are measured. Additionally, other international test methods are also being followed in North America. For example, the bending strength or modulus of rupture (MOR) can be measured after a soaking period following the Japanese standard and test method JIS A 5908. Also, the durability of the composites can be evaluated by measuring the thickness swell and internal bond strength of the composites after a strenuous 21-day cyclic test including soaking, freezing and baking cycles according to the European test method EN 321 (formerly known as V 313). The melamine can be incorporated into wood composites in the form of a melamine-urea-formaldehyde resin, a melamine-formaldehyde resin, or as a blend of a urea-formaldehyde resin and melamine-formaldehyde resin. U.S. Pat. No. 3,827,995 and 3,979,492) However, the addition of melamine adds significant cost to the composite.

Urea-formaldehyde binders are also used in other industrial applications, such as, for instance as binders for glass fibers used to make mats that are used in roofing shingles, carpet, vinyl flooring, and various other composites. In the manufacture of glass mat, the tensile strength of hot-wet samples of mat is routinely measured and compared to the tensile strength of dry samples to calculate a hot-wet tensile retention. Therefore, it is advantageous to modify the urea-formaldehyde binders with substances such as melamine or latexes that increase the moisture resistance of the cured mats.

Further, when urea-formaldehyde resins are used as a binder component they release formaldehyde into the environment during cure. Formaldehyde also can be released subsequently from the cured resin, particularly when the cured resin is exposed to acidic environments. Such formaldehyde release is undesirable, particularly in enclosed environments. In such environments, formaldehyde is inhaled by workers and comes into contact with the eyes, the mouth, and other parts of the body. Formaldehyde is malodorous and is thought to contribute to human and animal illness.

Various techniques have been used to reduce formaldehyde emission from urea-formaldehyde resins. Use of formaldehyde scavengers and various methods for resin formulation, including addition of urea as a reactant late in the resin formation reaction, are techniques often used to reduce formaldehyde emission. However, use of formaldehyde scavengers often is undesirable, not only because of the additional cost, but also because it affects the characteristics, or properties, of the resin. For example, using ammonia as a formaldehyde scavenger often reduces the resistance of the cured resin to hydrolysis (degradation). Later addition of urea to reduce free formaldehyde concentration in the resin generally yields a resin that must be cured at a relatively low rate to avoid smoking in certain processes or that cures more slowly than resins without scavengers in other processes. Resin stability also can be adversely affected by such treatments. Melamine has also been used to prepare resins which have low formaldehyde emissions (U.S. Pat. No. 5,681,917).

Melamine resins, particularly melamine-urea-formaldehyde (MUF resins), while useful to make moisture resistance particleboard, have very poor dilutability in water and therefore are inconvenient to handle at particleboard and MDF mills. The use of melamine resins as binders for glass mat or wet-process hardboard is severely limited by the lack of water solubility or dilutability of typical melamine-urea-formaldehyde binders.

It is known in the art that MF and MUF resins can be sulfonated to achieve water solubility (see, for example, U.S. Pat. No. 5,710,239 and EP 913412). However, when sulfonation is used to achieve water dilutability, an inverse relationship occurs between water dilutability in the liquid resin and the moisture resistance properties of the cured composite. Only a moderate amount of sulfonation can be tolerated if moisture resistance is to be maintained in composite materials such as particleboard and MDF, and this moderate level of sulfonation yields a moderately low water dilutability. Typical sulfonated MUFs currently manufactured for use as wood binders have a water dilutability of 2:1 (two parts of water to one part of resin) before the resin comes out of solution.

MUF resins can be made with a cyclic urea-formaldehyde prepolymer as disclosed in copending U.S. patent application Ser. No. 09/339,030, which is hereby incorporated by reference in its entirety. This patent discloses the use of the cyclic urea-formaldehyde prepolymer as a partial replacement for melamine while achieving comparable moisture resistance properties. However, the water dilutability of materials made following the process described in this patent is only 2:1 or lower, and after the water dilutability is exceeded, the resins may become very sticky and difficult to clean up.

BRIEF SUMMARY OF THE INVENTION

The present invention is directed to a binder comprising a melamine-urea-formaldehyde (MUF) resin modified with a cyclic urea prepolymer and with sodium metabisulfite.

MUF resins prepared with cyclic urea prepolymer and sodium metabisulfite display superior properties beyond what would have expected based on combining the known cyclic urea technology and known sulfonation technologies. Specifically, whereas the MUFs made according to the prior art processes have relatively low water dilutability, MUFs modified with both the cyclic urea-formaldehyde prepolymer and sodium metabisulfite exhibit a water dilutability in excess of 20:1 without the formation of a precipitate. This unique advantage makes the handling of these resins more like conventional UF resins, which can be rinsed off with water or diluted to low concentrations to improve resin distribution when applied to a substrate, such as in blowline application on fiber in the preparation of MDF. In wet processes such as glass mat the improvement in dilutability allows the modified MUF resins to run at much higher melamine levels than what conventional MUF technology can allow.

Moreover, other properties of the binder, such as press time and thickness swell, are not compromised by the addition of the sodium metabisulfite.

The present invention is further directed to composite products prepared with a substrate and a binder as defined above. In particular, the present invention is directed to wood based composites such as particleboard and medium density fiberboard. The invention is also directed to composites such as glass mat and other glass fiber based composites generally referred to as fiber reinforced plastics.

Despite the great improvement in water dilutability for the modified MUF resins versus conventional MUF resins, wood composites made with the modified MUF resins display better moisture resistance properties than those made with conventional MUF resins of the same melamine level. For example, particleboard and MDF made with the modified MUFs at a given melamine level are sufficiently superior in thickness swell, water absorption, wet MOR and performance in the V313 test to allow the board-manufacturers to reduce resin application rates while maintaining the same properties that are achieved at higher resin applications rates with conventional MUFs. Alternatively, the melamine level of the MUF resins can be reduced, and the thickness swell, water absorption, wet MOR and performance in the V313 test for the particleboard and MDF are the same as if the boards had been made with a higher melamine content conventional MUF.

In glass mat, the modified MUF resins yield superior moisture resistance to UF resins as indicated by better hot-wet tensile strength retentions.

BRIEF DESCRIPTION OF THE DRAWINGS

FIG. 2 shows lower thickness swells after V313 conditioning for the boards made with the modified MUF resin, and FIG. 3 shows improved internal bond strength after V313 conditioning for the boards made with the modified MUF resin.

DETAILED DESCRIPTION OF THE INVENTION

Figure 1:
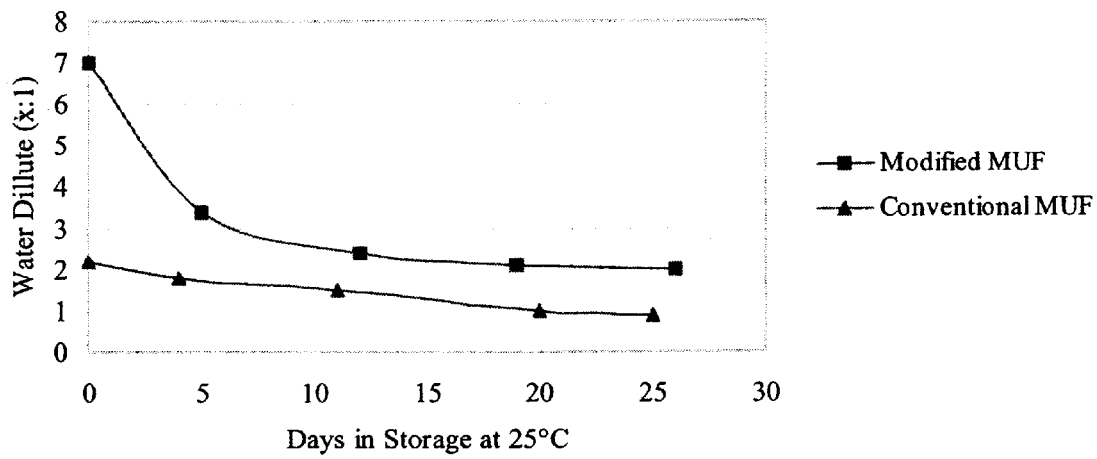
FIG. 1 shows the improvement in water dilutability of the modified binders versus conventional MUF binders with the same melamine level. In the example shown in FIG. 1, a one-month old sample of the modified MUF resin has the same water dilutability as a fresh sample of the conventional MUF.
Figure 2:
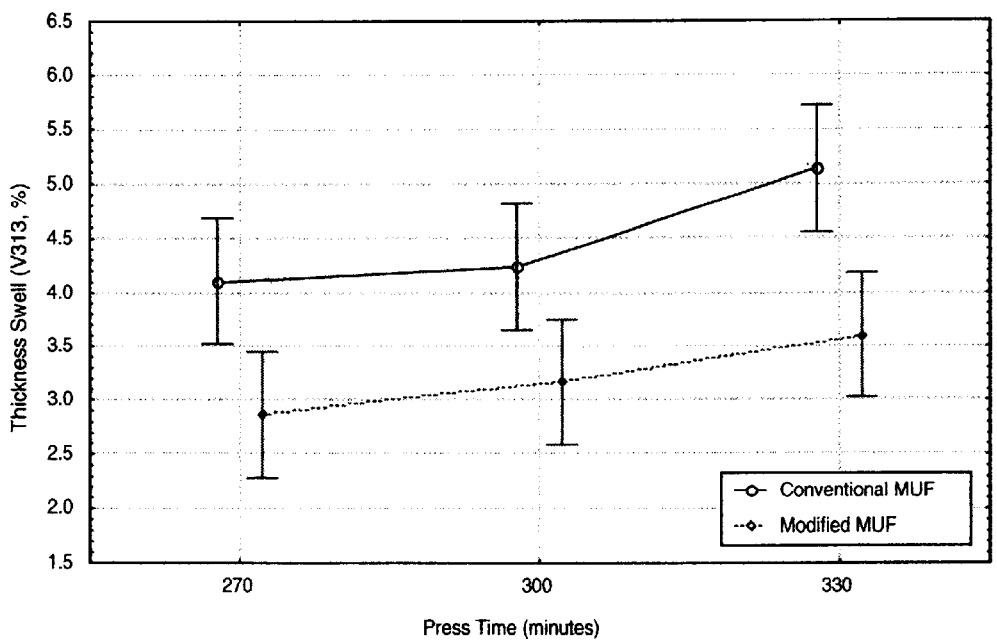
FIGS. 2 and 3 show examples of the improvement in moisture resistance properties of particleboard made with the modified MUF resins versus conventional MUF resins. Specifically.
Figure 3:
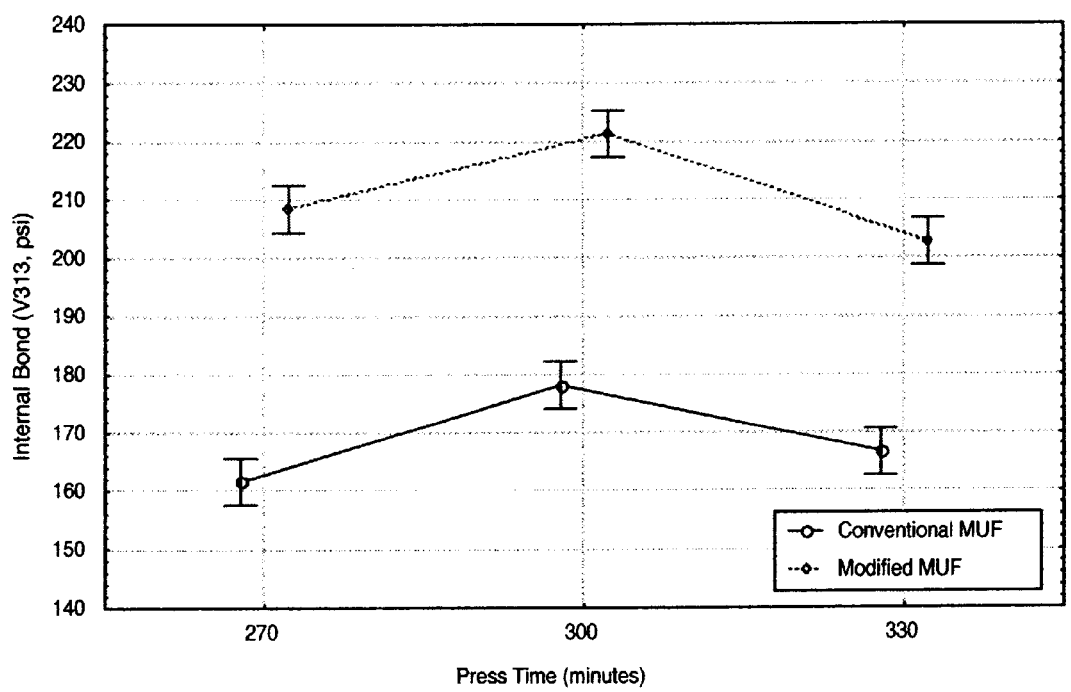

The present invention is directed to binders containing melamine-urea-formaldehyde resins that have been modified with a cyclic urea prepolymer and also modified with sodium metabisulfite. The resulting binders provide superior water dilutability compared to unmodified MUF resins and MUF resins modified only with the cyclic urea-formaldehyde prepolymer.

Typically, the cyclic urea prepolymer (also referred to as a cyclic urea-formaldehyde prepolymer) has mole ratios of urea:formaldehyde:ammonia or a primary amine between about 0.1 to 1.0:0.1 to 4.0:0.1 to 1.0.

The melamine-urea-formaldehyde resin modified with cyclic urea prepolymer and with sodium metasbisulfite may be prepared in any suitable manner. The cyclic urea prepolymer modifies the melamine-urea-formaldehyde resins and may be a cold blended additive or may be a coreactant added during the preparation of the binder.

In a preferred embodiment, formaldehyde, cyclic urea prepolymer, and melamine are first combined. In this step, the ratio of formaldehyde to melamine is typically in the range of about 2:1 to about 10:1, preferably about 2:1 to 8:1. The ratio of melamine to cyclic urea prepolymer on a solids basis is from about 100:1 to about 1:100, preferably about 10:1 to about 10:20, more preferably about 10:1 to about 10:10.

These materials are reacted together under a basic pH, typically about 8 to about 10, preferably about 8.5 to about 9.5. This first step typically starts at a temperature of about 50 to about 60° C., and the temperature is increased upon addition of melamine to about 90 to 100° C. The mixture is held until the desired degree of water dilutability is obtained, typically from about 5 to about 60 minutes, preferably from about 15 to about 45 minutes.

Alternatively, the cyclic urea prepolymer is prepared in situ such as described in U.S. Ser. No. 09/339,030 or by combining the formaldehyde amount from the first step in the preferred embodiment above with the amounts of formaldehyde, urea, and ammonia required to synthesize the equivalent amount of the cyclic urea prepolymer necessary for the first step.

Second, sodium metabisulfite is reacted with the product of the first step. The ratio of melamine to sodium metabisulfite may vary depending on the desired level of water dilutability of the liquid resin versus the moisture resistance required of the cured composite. The ratio of melamine to sodium metabisulfite on a weight basis is typically from about 10:5 to about 10:0.1, preferably about 10:3 to about 10:1. This step is typically done at a temperature of about 70 to about 90° C. for about 10 to about 60 minutes, preferably about 15 to about 45 minutes.

Third, urea, formaldehyde, and optionally a urea-formaldehyde concentrate are added to the mixture. The amounts of urea, formaldehyde, and urea-formaldehyde concentrate are related to the desired solids content of the resin and the solids content provided by the raw materials already present in the reactor. The molar ratio of formaldehyde to urea added in this step is typically from about 10:1 to about 1:100, preferably about 5:1 to about 1:50. The urea and formaldehyde may be added in one step or in multiple steps to affect how the resin will behave traveling down the line at facilities that manufacture composites with these resins. The formaldehyde and urea are added and reacted at a temperature of from about 50 to about 100° C., preferably about 70 to about 90° C.

The present invention requires a cyclic urea prepolymer-modified melamine-urea-formaldehyde resin. The cyclic urea prepolymer may be prepared by any suitable method. For example, urea, formaldehyde, and ammonia or primary amine are mixed and heated to the desired temperature for a set period of time to form a cyclic urea prepolymer. Preferably the mole ratio of reactants for the cyclic urea prepolymer are as follows:

Formaldehyde: About 0.1 to 4.0
Ammonia or Primary Amine: About 0.1 to 1.0
Urea: About 0.1 to 1.0

Any combination of the above mole ratios is contemplated; however, preferably the mole ratio of urea:formaldehyde:ammonia or primary amine is about 2.0:2.0:1.0 to 1.0:4.0:1.0 and more preferably about 2.0:4.0:1.0. It is contemplated that "ammonia or primary amine" also encompasses the use of both ammonia and a primary amine or more than one primary amine.

Processes of making cyclic urea prepolymers are recognized in the art. In a preferred embodiment, the cyclic urea prepolymer may be prepared by charging a reaction vessel with formaldehyde, ammonia, and urea while maintaining the temperature below about 70° C., preferably about 60° C. The order of addition is not critical, but it is important to take care during the addition of ammonia to formaldehyde (or formaldehyde to ammonia), due to the exothermic reaction. In fact, due to the strong exotherm, it may be preferred to charge the formaldehyde and the urea first, followed by the ammonia. This sequence of addition allows one to take advantage of the endotherm caused by the addition of urea to water to increase the rate of ammonia addition. Optionally a base may be added to maintain an alkaline condition throughout the cook.

Once all the reactants are in the reaction vessel, the resulting solution is heated to between about 85 to about 95° C., preferably about 90° C., for 30 to 90 minutes, usually about 1 hour or until the reaction is complete. Once the reaction is complete, the solution is cooled to room temperature for storage. The resulting solution is storage stable for several months at ambient conditions.

The yield is usually about 100%. The ratio of cyclic ureas to di- and tri-substituted ureas and mono-substituted ureas varies with the mole ratio of the reactants. For example, in a cyclic urea prepolymer having the mole ratio of 2.0:4.0:1.0 U:F:A, the urea was in the following proportions as characterized by $^{13}$C NMR: 42.1% cyclic ureas, 28.5% di/tri-substituted ureas, 24.5% mono-substituted ureas, and 4.9% free urea. A cyclic urea prepolymer having the mole ratio of 1.0:1.2:0.5 U:F:A resulted in a solution characterized by $^{13}$C NMR where the urea had the following forms: 25.7% cyclic ureas, 7.2% di/tri-substituted ureas, 31.9% mono-substituted ureas, and 35.2 free urea.

In addition, the cyclic urea prepolymer may be prepared by a method such as disclosed in U.S. Pat. No. 5,674,971, which is hereby incorporated by reference in its entirety. The cyclic urea prepolymer is prepared by reacting urea and formaldehyde in at least a two-step and optionally a three-step process. In the first step, conducted under alkaline reaction conditions, urea and formaldehyde are reacted in the presence of ammonia, at an F/U mole ratio of between about 1.2:1 and 1.8:1. The ammonia is supplied in an amount sufficient to yield an ammonia/urea mole ratio of between about 0.05:1 and 1.2:1. The mixture is reacted to form a cyclic triazone/triazine or cyclic urea prepolymer which forms the building block for the ultimate resin.

Water soluble triazone compounds may also be prepared by reacting urea, formaldehyde and a primary amine as described in U.S. Pat. Nos. 2,641,584 and 4,778,510, each of which is incorporated by reference in its entirety. These patents also describe suitable primary amines such as, but not limited to, alkyl amines such as methyl amine, ethyl amine, and propyl amine, lower hydroxyamines such as ethanolamine cycloalkylmonoamines such as cyclopentylamine, and linear polyamines. The primary amine may be substituted or unsubstituted.

The binders of the present invention are typically clear liquids at room temperature, although some will be white, particularly at higher degrees of advancement. For specific applications the products of the invention may be spray dried to a solid form.

The liquid version of the binders will typically have a Brookfield viscosity in the range of 60–400 cps at 65% solids, but binders of both higher and lower viscosities and higher and lower solids contents may be prepared with careful control of the time and temperature of the reaction and should be considered equivalent as long as they can be applied to a substrate in the manufacture of composites.

The free formaldehyde of the resins will typically be below 1%, preferably below 0.5%, and most preferably below 0.1%. Higher free formaldehyde versions of the products of this invention are typically less desirable because of the increased formaldehyde emissions but are still within the scope of present invention.

An advantage of the prepolymer-modified binder described herein versus binders with no cyclic urea-formaldehyde prepolymer is the reduced cost of the binder when part of the melamine in a typical formulation is replaced with the lower cost prepolymer.

Skilled practitioners recognize that the reactants are commercially available in many forms. Any form which can react with the other reactants and which does not introduce extraneous moieties deleterious to the desired reactions and reaction products can be used in the preparation of the resins of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde, often in aqueous solution. Any form of urea or urea in combination with formaldehyde is suitable for use in the practice of the invention. Both urea prill and combined urea-formaldehyde products are preferred, such as Urea Formaldehyde Concentrate or UFC 85. These types of products are disclosed in, for example, U.S. Pat. Nos. 5,362,842 and 5,389,716.

Ammonia is available in various gaseous and liquid forms, particularly including aqueous solutions at various concentrations. Any of these forms is suitable for use. However, commercially-available aqueous ammonia-containing solutions are preferred herein. Such solutions typically contain between about 10 and 35% ammonia. A solution having 35% ammonia can be used providing stability and control problems can be overcome. An aqueous solution containing about 28% ammonia is particularly preferred. Anhydrous ammonia may also be used.

Suitable basic catalysts used to prepare the resins include, but are not limited to, alkali metal hydroxides, alkaline earth hydroxides, ammonium hydroxide, metal carbonates, and amines. Suitable acidic catalysts used to prepare the resins are various dilute acids or acid salts including but not limited to, ammonium sulfate, ammonium chloride, and formic acid.

The reactants may also include a small amount of a resin modifier such as ethylenediamine (EDA). Additional modifiers, such as sucrose or other sugars, ethylene ureas, and primary, secondary and triamines, for example, dicyanodiamide can also be incorporated into the resins of the invention. Concentrations of these modifiers in the reaction mixture may vary from 0.05 to 10.00%. These types of modifiers promote hydrolysis resistance, polymer flexibility and lower formaldehyde emissions.

To achieve the desired result as disclosed herein, the ingredients can be blended or reacted in any desirable and effective order. For example, the cyclic urea prepolymer may be added to the binder composition as a separate material but may also be added as urea, formaldehyde, and ammonia in any order of addition that achieves the desired cyclic urea prepolymer product. Melamine and other ingredients may also be blended or coreacted in any order to achieve the desired end product.

Binders are prepared using the cyclic urea prepolymer-modified melamine-containing resins. The binders of the present invention may be used to prepare particleboard, MDF or other wood composites. The binders may include, as desired, catalysts, additional water to achieve a desired solids level, waxes or other hydrophobic additives, or any of the additives that are known to those skilled in the art of manufacturing wood composites. For plywood applications, typical additives will include fillers such as ground pecan or walnut shells and extenders such as wheat flour that improve the ability of the binder to remain at the glue line and decrease the total cost of the binder package.

Wood composites such as particleboard and medium density fiberboard are made by curing wood particles or fibers in a hot press in the presence of a thermosetting binder. The wood raw material is reduced to the appropriate size by various processes such as hogging, grinding, hammer milling and flaking. The wood or fiber substrate is then dried to a uniform moisture content and screened to achieve a desired particle size distribution. The wood or fiber is then blended with the resin binder, formed into a mat, and consolidated in a hot press to a desired density and thickness (flat-press process). Alternatively, the blended furnish may be continually extruded through a hot die (extrusion process). Finishing processes include trimming and sanding, and in some instances cutting to size, routing, etc.

EXAMPLE 1

Eight parts of a formaldehyde solution (50% formaldehyde in water) are mixed with eight parts of a cyclic urea-formaldehyde prepolymer (prepared as described in Example 1 of copending U.S. application Ser. No. 09/339,030) and adjusted to a basic pH of about 9–10. The mixture is then heated to 60° C., treated with eight parts of melamine, and further heated until the melamine completely dissolves.

One part of sodium metabisulfite is then loaded at 90° C. The mixture is then cooled to 50° C. and further quantities of urea and formaldehyde or a urea-formaldehyde concentrate are added. For example, 25 parts of the urea-formaldehyde concentrate, 10 parts of urea, and 20 parts of formaldehyde may be added. The materials are reheated to 90° C. and reacted at a basic pH (7–8). Optionally, further urea additions may take place. For example, 5 more parts of urea may be added. The reactants are typically heated for a period of time to achieve a desired viscosity.

Additional quantities of urea, formaldehyde or urea-formaldehyde concentrates may be added. For example, 20 more parts of urea may be added after the desired viscosity has been achieved. Lastly, the storage pH of the resin may be adjusted, typically into a basic range of 7–10.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A binder comprising a melamine-urea-formaldehyde resin modified with a cyclic urea prepolymer and with sodium metabisulfite.

2. The binder of claim 1 wherein the cyclic urea prepolymer has mole ratios of urea:formaldehyde:ammonia or a primary amine between about 0.1 to 1.0:0.1 to 4.0:0.1 to 1.0.

3. The binder of claim 1 wherein the water dilutability of the resin is at least about 20:1.

4. The binder of claim 1 prepared by the steps of:
   first, combining formaldehyde, cyclic urea prepolymer, and melamine;
   second, adding sodium metabisulfite; and
   third, adding urea, formaldehyde, and optionally a urea-formaldehyde concentrate.

5. The binder of claim 4 wherein the formaldehyde and melamine are combined in the first step in a formaldehyde:melamine molar ratio of about 1:1 to about 10:1.

6. The binder of claim 5 wherein the formaldehyde:melamine molar ratio is about 2:1 to about 8:1.

7. The binder of claim 4 wherein the melamine and cyclic urea prepolymer are combined on a solids basis at a melamine:cyclic urea prepolymer ratio of about 100:1 to about 1:100.

8. The binder of claim 7 wherein the melamine:cyclic urea prepolymer ratio is about 10:1 to about 10:20.

9. The binder of claim 4 wherein the formaldehyde, cyclic urea prepolymer, and melamine are combined in the first step at a basic pH.

10. The binder of claim 9 wherein the basic pH is about 8 to about 10.

11. The binder of claim 10 wherein the basic pH is about 8.5 to about 9.5.

12. The binder of claim 4 wherein the sodium metabisulfate is added in the second step to obtain a melamine:sodium metabisulfite weight ratio from about 10:5 to about 10:0.1.

13. The binder of claim 12 wherein the melamine:sodium metabisulfite weight ratio is about 10:3 to about 10:1.

14. The binder of claim 4 wherein the formaldehyde and urea are added in step three at a formaldehyde:urea molar ratio of from about 10:1 to about 1:100.

15. The binder of claim 14 wherein the formaldehyde:urea molar ratio is about 5:1 to about 1:50.

16. A consolidated wood product comprising a substrate and the binder of claim 1.

17. A consolidated wood product comprising a substrate and the binder of claim 4.

18. A method of preparing a binder comprising:
   first, combining formaldehyde, cyclic urea prepolymer, and melamine;
   second, adding sodium metabisulfite; and
   third, adding urea, formaldehyde, and optionally a urea-formaldehyde concentrate.

19. A consolidated wood product comprising a substrate and a wood binder comprising a melamine-urea-formaldehyde resin modified with a cyclic urea prepolymer and sodium metabisulfite.

20. A consolidated wood product according to claim 19 wherein the weight ratio of melamine to sodium metabisulfite is about 10:5 to about 10:0.1.

21. The consolidated wood product of claim 19 wherein the consolidated wood product is particleboard, fiberboard, or plywood.

22. A consolidated composite product comprising a substrate and a binder comprising a melamine-urea-formaldehyde resin modified with a cyclic urea prepolymer, and sodium metabisulfite.

23. A consolidated composite according to claim 22 wherein the weight ratio of melamine to sodium metabisulfite is about 10:5 to about 10:0.1.

24. The consolidated composite product of claim 22 wherein the consolidated composite product is a glass mat.

25. The consolidated composite product of claim 22 wherein the consolidated composite product is a fiber reinforced plastic composite.

* * * * *